A. KIMBER.

Improvement in Apple and Vegetable Knives.

No. 129,966. Patented July 30, 1872.

WITNESSES.
Villette Anderson
Geo E. Upham

INVENTOR.
Abraham Kimber
Chipman Hosmer & Co,
Attys,

UNITED STATES PATENT OFFICE.

ABRAHAM KIMBER, OF MUNCIE, INDIANA.

IMPROVEMENT IN APPLE AND VEGETABLE KNIVES.

Specification forming part of Letters Patent No. 129,966, dated July 30, 1872.

*To all whom it may concern:*

Be it known that I, ABRAHAM KIMBER, of Muncie, in the county of Delaware and State of Indiana, have invented a new and valuable Improvement in the Apple-Corer and Vegetable-Knife; and I do hereby declare that the following is a full, clear, and exact description of the construction and operation of the same, reference being had to the annexed drawing making a part of this specification, and to the letters and figures of reference marked thereon.

Figure 1:
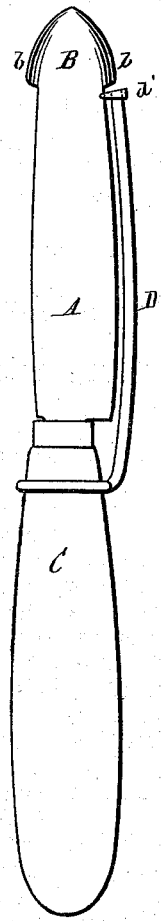
Figure 2:
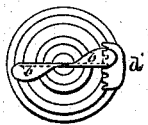

Figure 1 of the drawing is a representation of a side view of my invention. Fig. 2 is an end view of the same.

My invention has relation to knives for coring apples, paring fruit and vegetables, removing the eyes from potatoes; and consists in the novel construction of the knife-blade and of an adjustable gage, as hereinafter described.

Referring to the accompanying drawing illustrating this invention, A designates the blade, sharpened on one or both edges, and furnished with a barbed point, B, with the wings *b* bent back from the blade in opposite directions and sharpened. The blade proper is useful for paring fruit or vegetables and for removing the cores of different kinds of fruit. The barbed head is used with the blade for such work, but is designed principally for removing eyes from potatoes or specks from fruit or vegetables. Either or both wings of the barbed head may be used at once for the latter purpose, the handle C being twirled by the hand. D designates the gage, which consists of a wire having a ring, *d*, at one end, which encircles the handle near the blade and within a groove, and at the other end a cross-piece or pair of arms, $d'$, notched on its inner edge, as shown. The piece $d'$ rests against the edge of the blade directly behind one of the shoulders of the barbed head, and regulates the depth of the cut of the adjacent wing. The notches retain the piece $d'$ at any position to which it may be adjusted. The gage may be turned around on the handle so as to enable it to be used with either wing.

What I claim as new is—

The combination, with the blade A and head B having the wings *b*, of the adjustable gage D, substantially as specified.

In testimony that I claim the above I have hereunto subscribed my name in the presence of two witnesses.

ABRAHAM KIMBER.

Witnesses:
    ELIAS A. MADDY,
    JOB LENAIN.